(12) United States Patent
Matsui et al.

(10) Patent No.: US 7,712,814 B2
(45) Date of Patent: May 11, 2010

(54) STORAGE DEVICE FOR VEHICLE

(75) Inventors: Toru Matsui, Wako (JP); Toshikazu Kamioka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 12/243,169

(22) Filed: Oct. 1, 2008

(65) Prior Publication Data
US 2009/0091152 A1 Apr. 9, 2009

(30) Foreign Application Priority Data
Oct. 4, 2007 (JP) ............... 2007-260645

(51) Int. Cl.
*B60R 7/00* (2006.01)

(52) U.S. Cl. ............... 296/37.8; 296/37.1; 296/187.05; 16/387

(58) Field of Classification Search ............... 296/37.1, 296/37.8, 37.12, 187.01, 187.05; 16/387; *B60R 7/00*
See application file for complete search history.

(56) References Cited

U.S. PATENT DOCUMENTS

| | | | | |
|---|---|---|---|---|
| 5,482,319 A | * | 1/1996 | Yoshimura et al. | 280/752 |
| 5,882,037 A | * | 3/1999 | Bauer et al. | 280/748 |
| 6,076,878 A | * | 6/2000 | Isano | 296/37.12 |
| 6,299,208 B1 | * | 10/2001 | Kasahara et al. | 280/752 |
| 6,896,308 B2 | * | 5/2005 | Okanda et al. | 296/37.12 |
| 7,484,792 B2 | * | 2/2009 | Penner | 296/187.05 |
| 2004/0124623 A1 | | 7/2004 | Yamazaki | |
| 2004/0262903 A1 | * | 12/2004 | Tajima et al. | 280/753 |

FOREIGN PATENT DOCUMENTS

| | | |
|---|---|---|
| JP | 08-002333 | 1/1996 |
| JP | 09-086318 | 3/1997 |
| JP | 2000110433 A * | 4/2000 |

* cited by examiner

*Primary Examiner*—Patricia L Engle
*Assistant Examiner*—Pinel E Romain
(74) *Attorney, Agent, or Firm*—Rankin, Hill & Clark LLP

(57) ABSTRACT

A vehicular storage device provided in opposed relation to a passenger seat. A convex part, protruding from a rear surface of a lid in a direction opposite from a vehicle occupant, has a deformation allowance part that deforms when an impact is applied to the convex part.

5 Claims, 7 Drawing Sheets

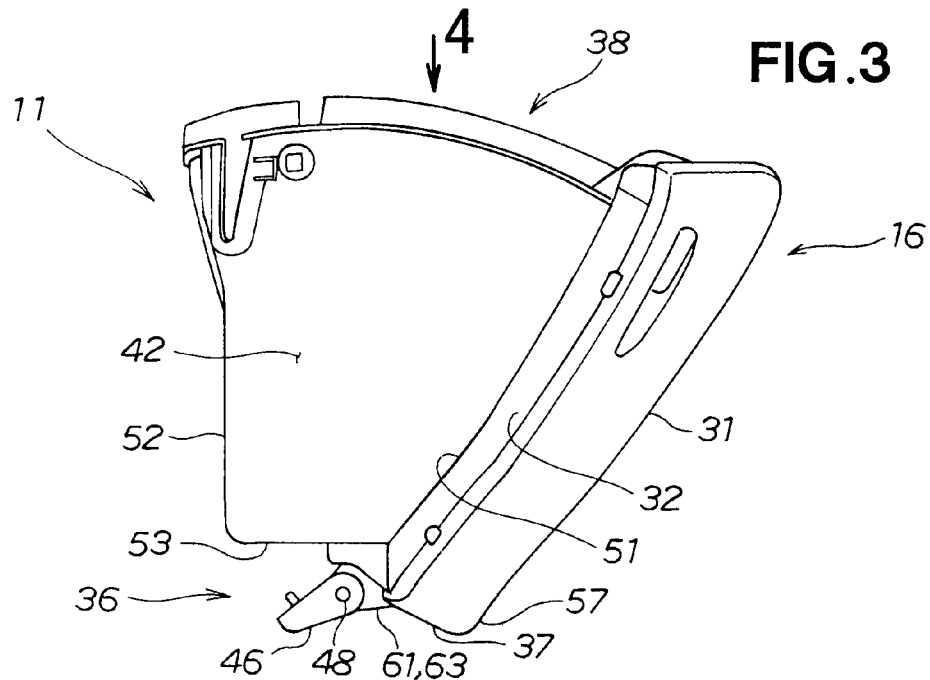
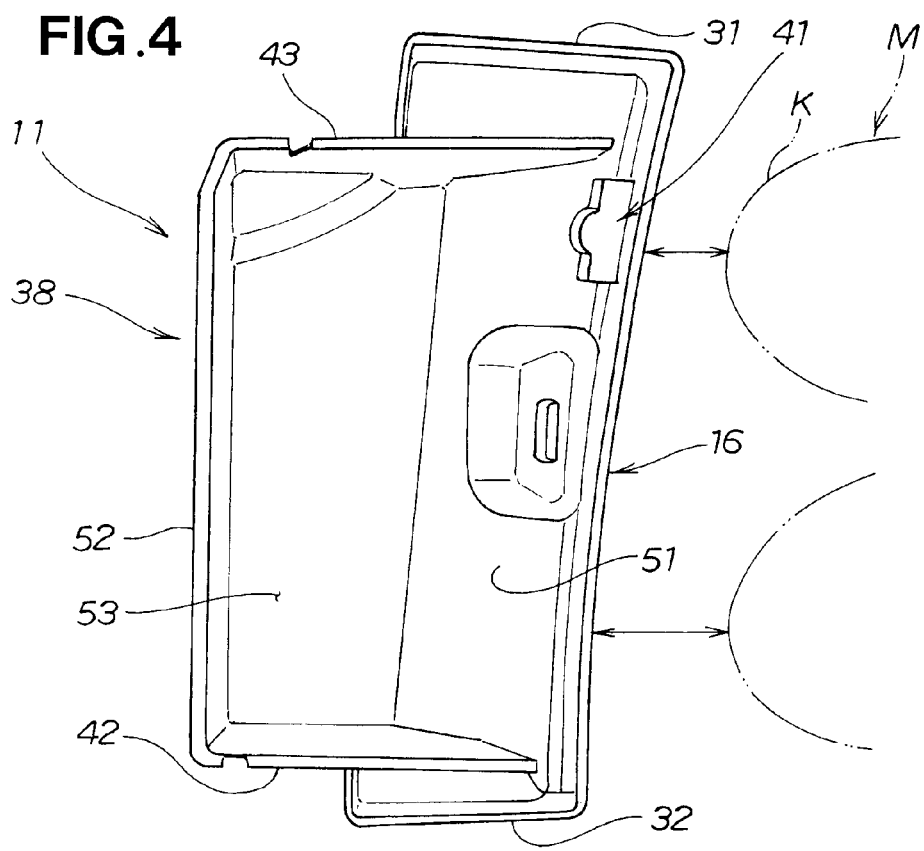

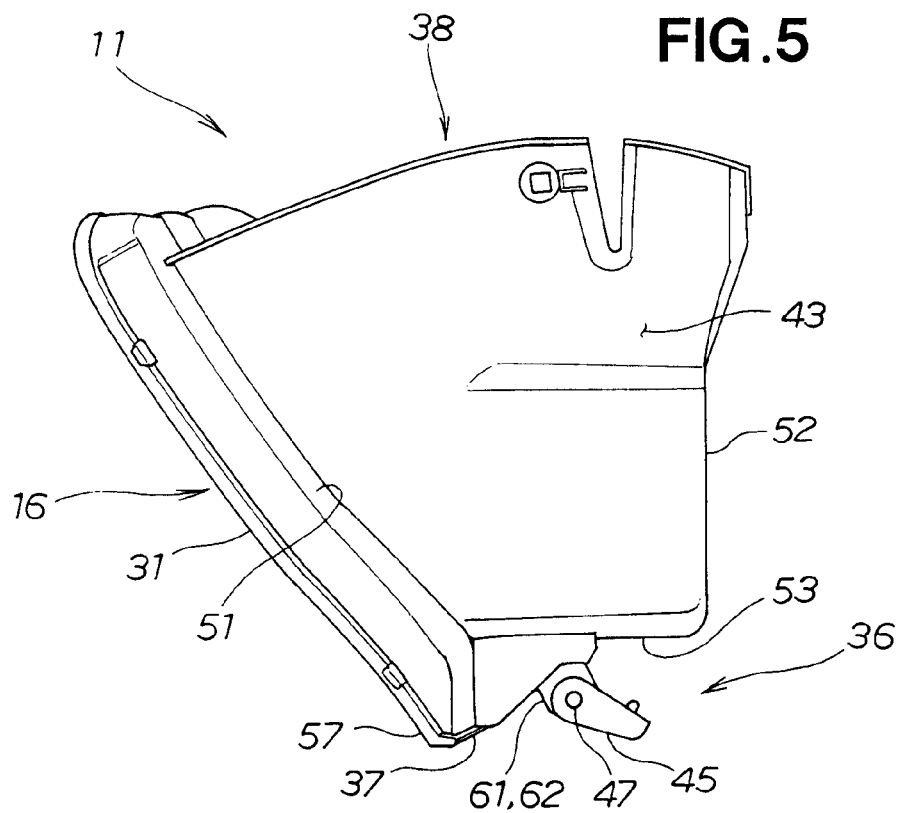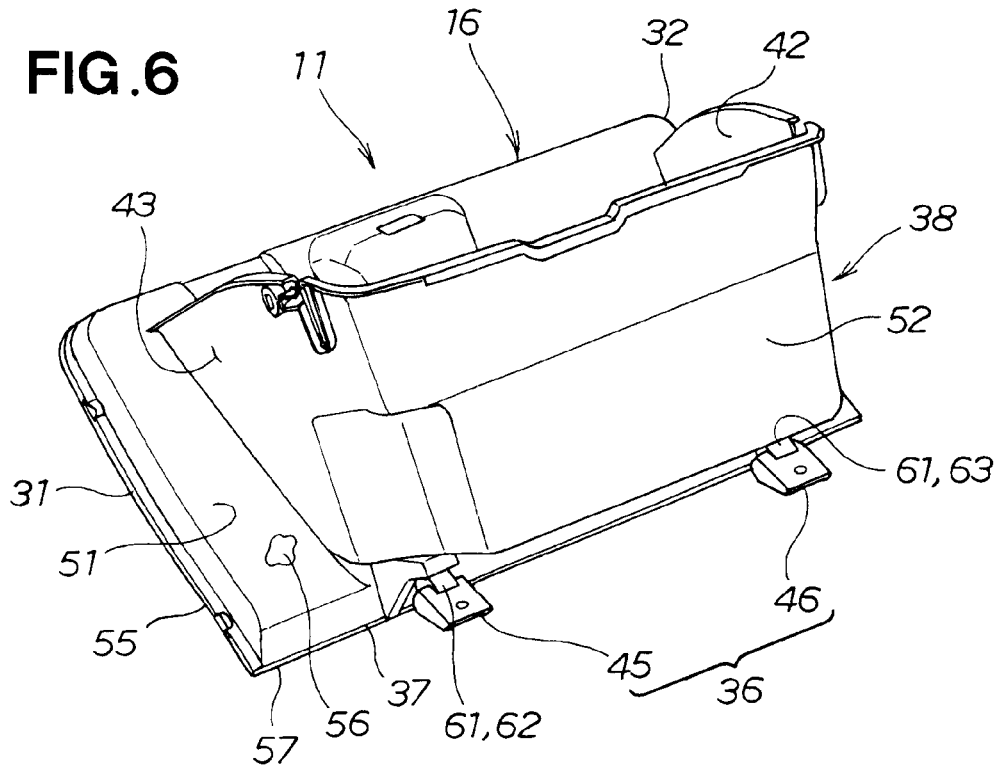

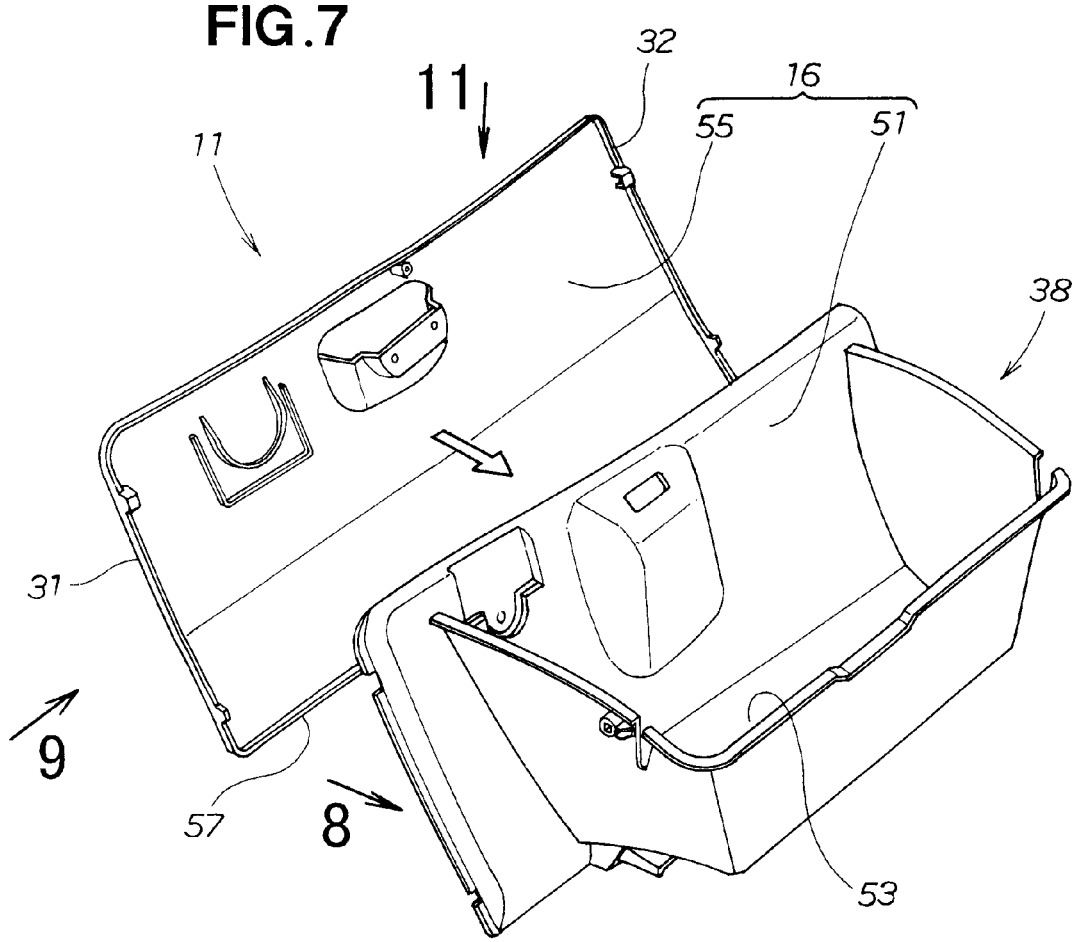
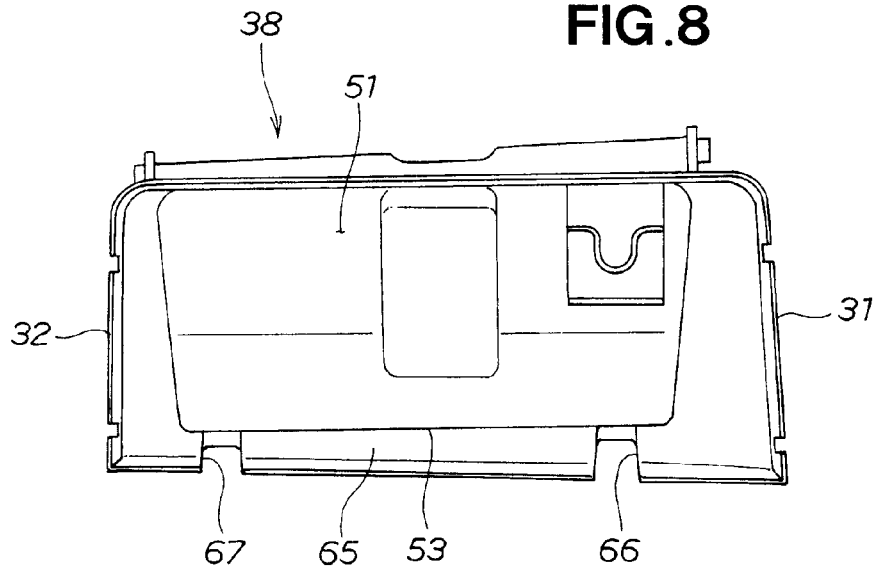

STORAGE DEVICE FOR VEHICLE

FIELD OF THE INVENTION

The present invention relates to a vehicular storage device provided in a passenger compartment in opposed relation to a passenger seat.

BACKGROUND OF THE INVENTION

A glove box, which is a storage device for a vehicle provided in front of a passenger seat, is disclosed in JP 08-002333 A.

The glove box is disposed in an instrument panel in front of the passenger seat so that the left and right side surfaces of the box are substantially parallel with the front doors of the vehicle. The side surfaces of the box are formed with curved surfaces in which the sides each bulge inward. An impact can be absorbed by mounting ribs on the curved surfaces.

However, a depth in the glove box is necessary for the left and right sides to deform and collapse, and the effect cannot be expected under a condition in which the depth is reduced. In the particular case that an interior design is adopted in which the instrument panel curves toward the center of the vehicle width so as to encompass vehicle occupants, the center portion of the instrument panel between the driver seat and the passenger seat bulge. Therefore, the depth of the left side surface in the vicinity of the vehicle door cannot be assured in comparison with the right side surface of the glove box in the vicinity of the center portion. In other words, there is a problem in that a distance between the passenger seat and the glove box is less on the right side surface of the glove box in the vicinity of the center portion, and the glove box collides with the legs of a vehicle occupant before the effect of an impact is sufficiently absorbed. The shape of the left and right side surfaces can be made different, but the structure then becomes complex.

A glove box disclosed in JP 09-086318 A has a front surface wall disposed in an instrument panel. The front surface wall is configured as a hollow structure composed of a base wall of a box, and a surface plate mounted on the seat side of the base wall. The hollow interior has lattice-shaped means for absorbing an impact. Impact-absorption is improved for this reason.

However, a thickness sufficient for providing the lattice shaped impact absorption means in the hollow space of the front wall is necessary in the front surface wall of the structure of the glove box, but, depending on conditions, a sufficient thickness of the front surface wall cannot be assured when a certain storage capacity is provided. For example, in the case of an interior design in which the instrument panel is made to curve so as to encompass the vehicle occupants, the center portions of the instrument panel between the driver seat and the passenger seat bulge, but the depth is reduced in the vicinity of the door. Therefore, the hollow space of the front wall is made thin, and as a result, the ability of the impact absorbing means to deform is reduced and it is difficult for the impact to be absorbed. The thickness of the hollow space in the vicinity of the center components can be increased (made wider), but the structure is made more complex in terms of setting the thickness of the impact absorbing means as well as in other aspects.

SUMMARY OF THE INVENTION

It is therefore an object of the present invention to provide a storage device for a vehicle that can better absorb an impact and has a simple impact-absorbing structure even when storage depth cannot be provided.

According to an aspect of the present invention, there is provided a vehicular storage device which comprises a lid disposed in opposed relation to a vehicle occupant, a convex part protruding from a rear surface of the lid in a direction opposite from the vehicle occupant, and a shaft part provided on the convex part for swingably supporting the lid. The convex part has a deformation allowance part for allowing deformation when a load of a predetermined level or greater is applied to the convex part.

When the vehicle has a frontal collision, the lid is pushed into the passenger compartment by an impact applied from the front surface of the vehicle, and when the lid interferes with a leg of the vehicle occupant in the passenger seat, the deformation allowance part becomes the point of origin, deforms together with the convex part, and absorbs the impact applied to the leg. At this time, the lid connected to the convex part also deforms and absorbs the impact. As a result, an impact applied from the front surface of a vehicle can be sufficiently absorbed, even in a storage device in which storage depth cannot be increased.

Preferably, the shaft part is provided at a distal end of the convex part, and the deformation allowance part has a chevron shape notched to open downwardly at a center portion of the convex part. The deformation allowance part can reliably be made to deform even when a load is applied to the lid upward from below.

Desirably, the lid is arranged such that distances from left and right ends of the lid to the vehicle occupant are different, and the deformation allowance part is formed on the convex part which is provided on that one of right and left ends of the lid which has a shorter distance to the vehicle occupant. An impact can be absorbed effectively even in a case in which there is variability in input force.

BRIEF DESCRIPTION OF THE DRAWINGS

Certain preferred embodiments of the present invention will be described in detail below, by way of example only, with reference to the accompanying drawings, in which:

FIG. 3 is a left side elevational view of the storage device of FIG. 2;

FIG. 4 is a top plan view of the storage device as seen in the direction of arrow 4 of FIG. 3;

FIG. 5 is a right side elevational view of the storage device;

FIG. 6 is a perspective of the storage device as seen from a box part side;

FIG. 7 is an exploded view showing the storage device of FIG. 6;

FIG. 8 is a front elevational view of the box part as seen in the direction of arrow 8 of FIG. 7;

12B shows a relationship between the storage device and the vehicle occupant upon receipt of an impact.

DETAILED DESCRIPTION OF THE PREFERRED EMBODIMENTS

Figure 1:
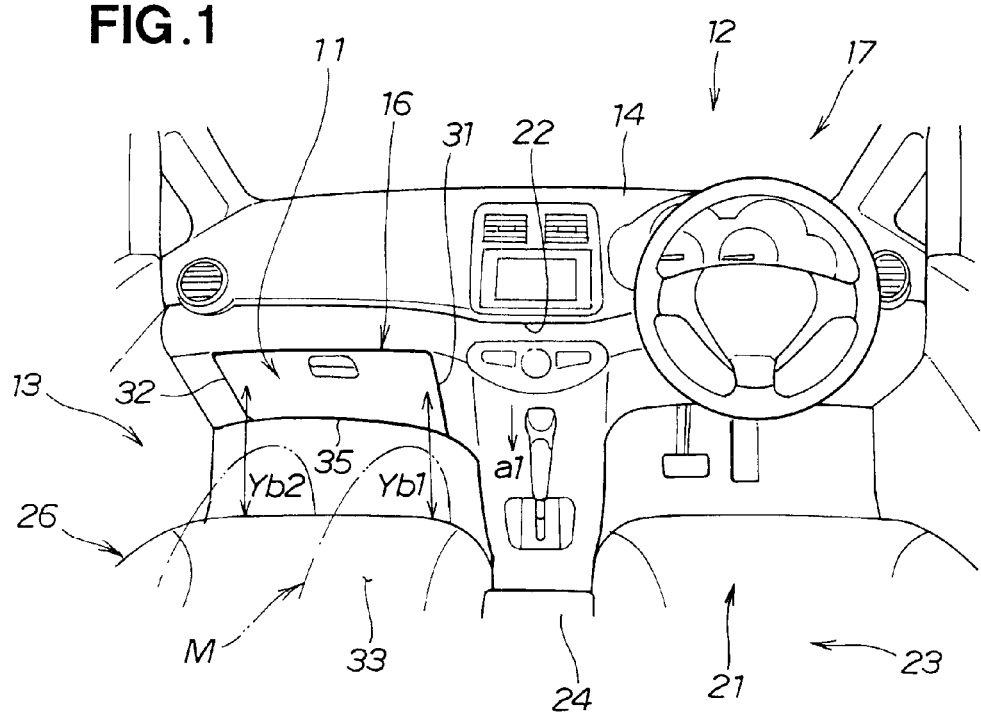
FIG. 1 is a schematic view showing a front seat of a vehicle provided with a storage device according to the present invention.
Figure 2:
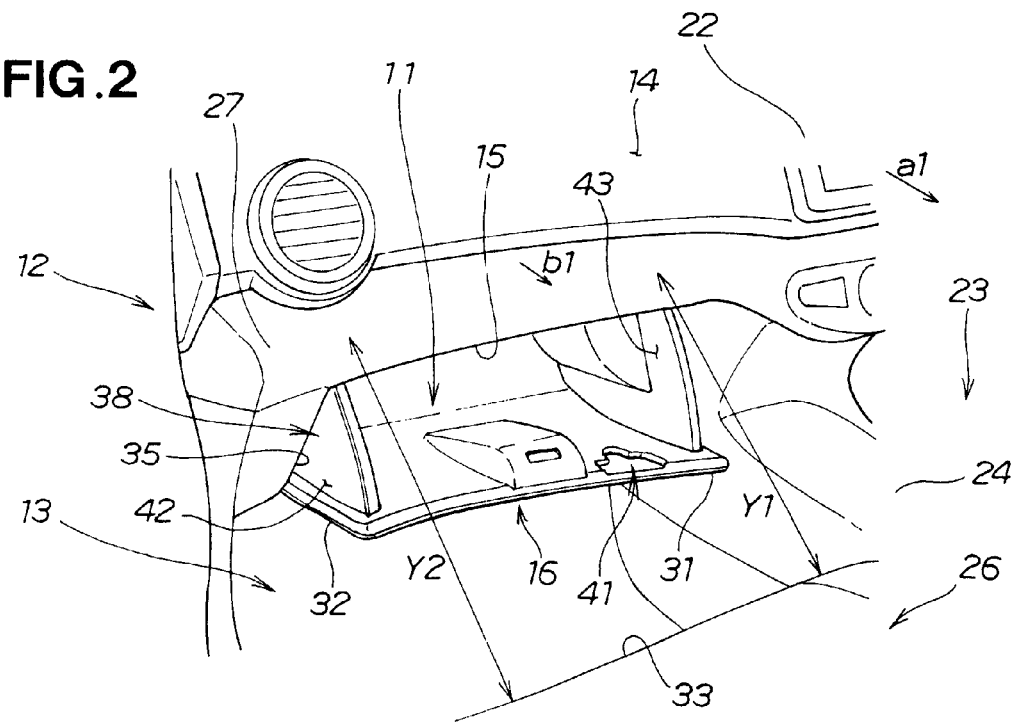
FIG. 2 is a perspective view showing the storage device of FIG. 1 in an opened state.

A storage device 11 is a glove box provided to a passenger seat 13 of a vehicle 12, and is disposed in an opening part 15 of an instrument panel 14 on the side of the passenger seat 13. A lid 16 opens when drawn toward a vehicle occupant M, and accommodates small articles, as seen in FIGS. 1, and 2. A front body 17 supports the engine in the forward area of the instrument panel 14.

The instrument panel 14 curves so as to encompass the vehicle occupant M. In other words, the instrument panel 14 curves by having the center portion 22 between the driver seat 21 and the passenger seat 13 form a bulge toward (in the direction of arrow a1) the center of the front-to-rear direction of the passenger compartment 23. The center portion 22 of the instrument panel 14 is connected to a center console 24 positioned at the center of the vehicle width of the passenger compartment 23. The vicinity of the center portion 22 is, e.g., nearer a seat 26 of the passenger seat 13 (distance Y1), and a left-end part 27 is farther away from the seat 26 (distance Y2>Y1). The lid 16 is formed using a curve that conforms to the curve of the instrument panel 14. For example, a distance from one end (right end) 31 of the lid 16 to the seat 26 is Yb1, a distance from the other end (left end) 32 of the lid 16 is Yb2 (Yb2>Yb1), and the one end 31 of the lid 16 is also nearer to the vehicle occupant M.

The distances Yb1, Yb2 are set with reference to a seat cushion 33 of the seat 26, but the reference may be other than the seat 26. In other words, the length of lid 16 in the front-to-rear direction of the vehicle orthogonal to the direction of the vehicle width may be different at one end 31 and the other end 32.

The storage device 11 has a hinge mechanism 36 mounted on an opening lower part 35 of the opening part 15 of the instrument panel 14. The device also has the lid 16 in which the hinge mechanism 36 is provided to a lower part 37. The device further has a box part 38 connected to the lid 16, and a card holder 41 provided to the internal surface of the lid 16, as shown in FIGS. 2 through 5.

The lid 16 shown in FIG. 4 differs in distance from the passenger seat 13 and the legs K of the vehicle occupant M, as described above. In other words, the depth (the length in the front-to-rear direction of the vehicle) of the right-side wall part 43 is greater in comparison to the left-side wall part 42 of the box part 38.

The hinge mechanism 36 is composed of the first hinge mechanism 45 connected to one end 31 of the lid 16 on the instrument panel 14, and a second hinge mechanism 46 connected to the other end 32 on the instrument panel 14.

A first shaft part 47 of the first hinge mechanism 45 is concentric with a second shaft part 48 (FIG. 3) of the second hinge mechanism 46, and the first shaft part 47 and the second shaft part 48 are the rotating support points when the box part 38 is drawn open.

The box part 38 is composed of a left-side wall part 42, a right-side wall part 43, a front wall part 51, a rear wall part 52, and a bottom part 53.

The lid 16 is composed of a front wall part 51, an interior wall part 55 is integrally latched onto the front wall part 51, and a hollow part 56 composed of the front wall part 51 and the interior wall part 55, as shown in FIGS. 6 and 7. Convex parts 61, 61 are formed on the interior lower part 57 of the interior wall part 55, and the hinge mechanism 36 is connected to the convex parts 61, 61.

The convex parts 61 are composed of a first convex part 62 on which a first hinge mechanism 45 is attached, and a second convex part 63 on which a second hinge mechanism 46 is attached.

The front wall part 51 has a lower elongated part 65 that extends from the bottom part 53 in an external direction of the box part 38, as shown in FIG. 8. The lower elongated part 65 is provided with a first through part 66, through which the first convex part 62 (FIG. 6) formed on one end 31 is passed, and a second through part 67, through which the second convex part 63 (FIG. 6) that is formed on the other end 32 is passed.

Figure 9:
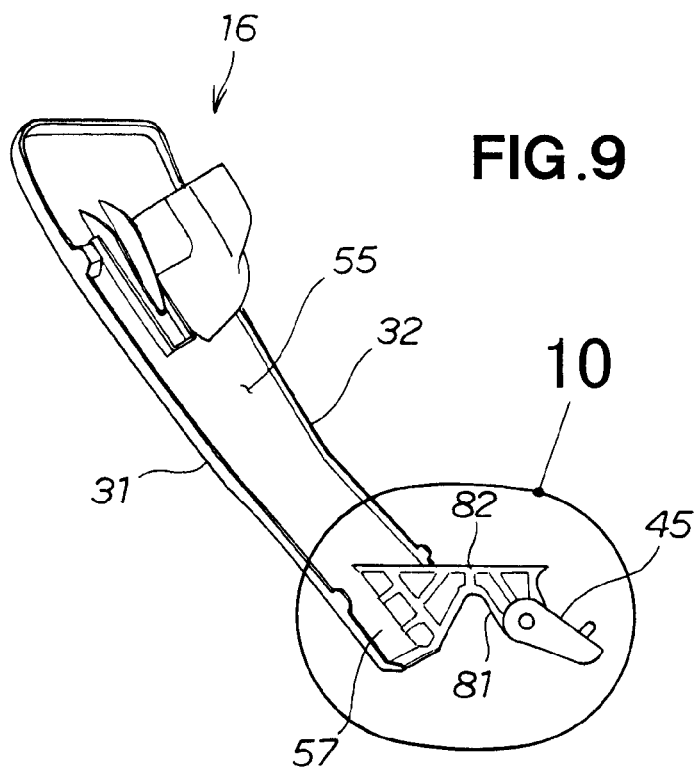
FIG. 9 is a side elevational view of a lid as seen in the direction of arrow 9 of FIG. 7.
Figure 10:
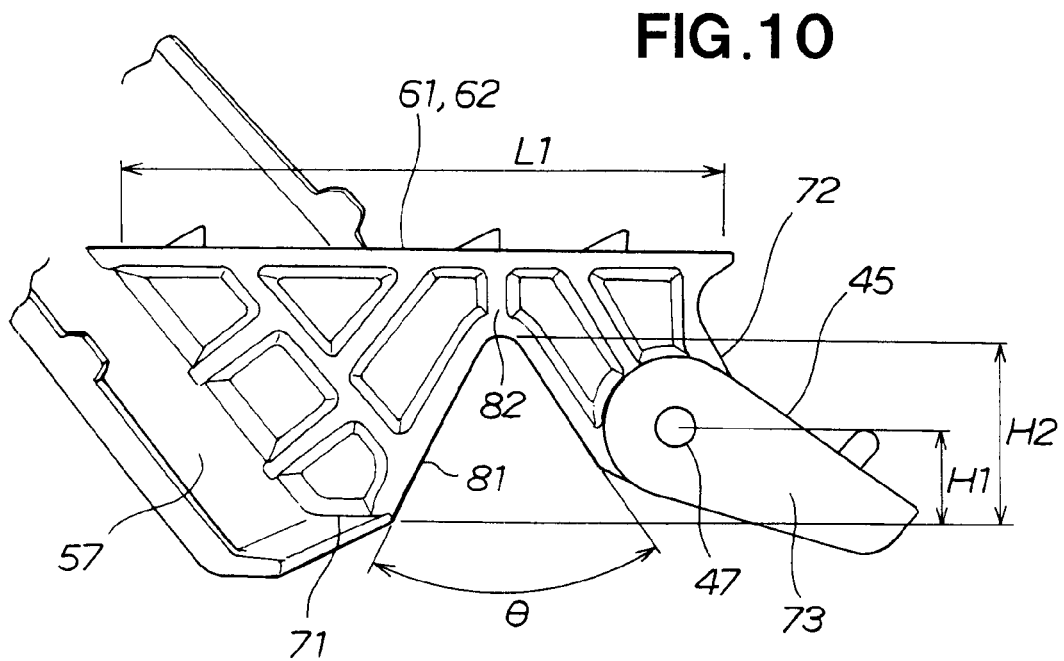
FIG. 10 is an enlarged view of portion 10 of FIG. 9, showing a convex part, a deformation allowance part and a shaft part provided to the lid.
Figure 11:
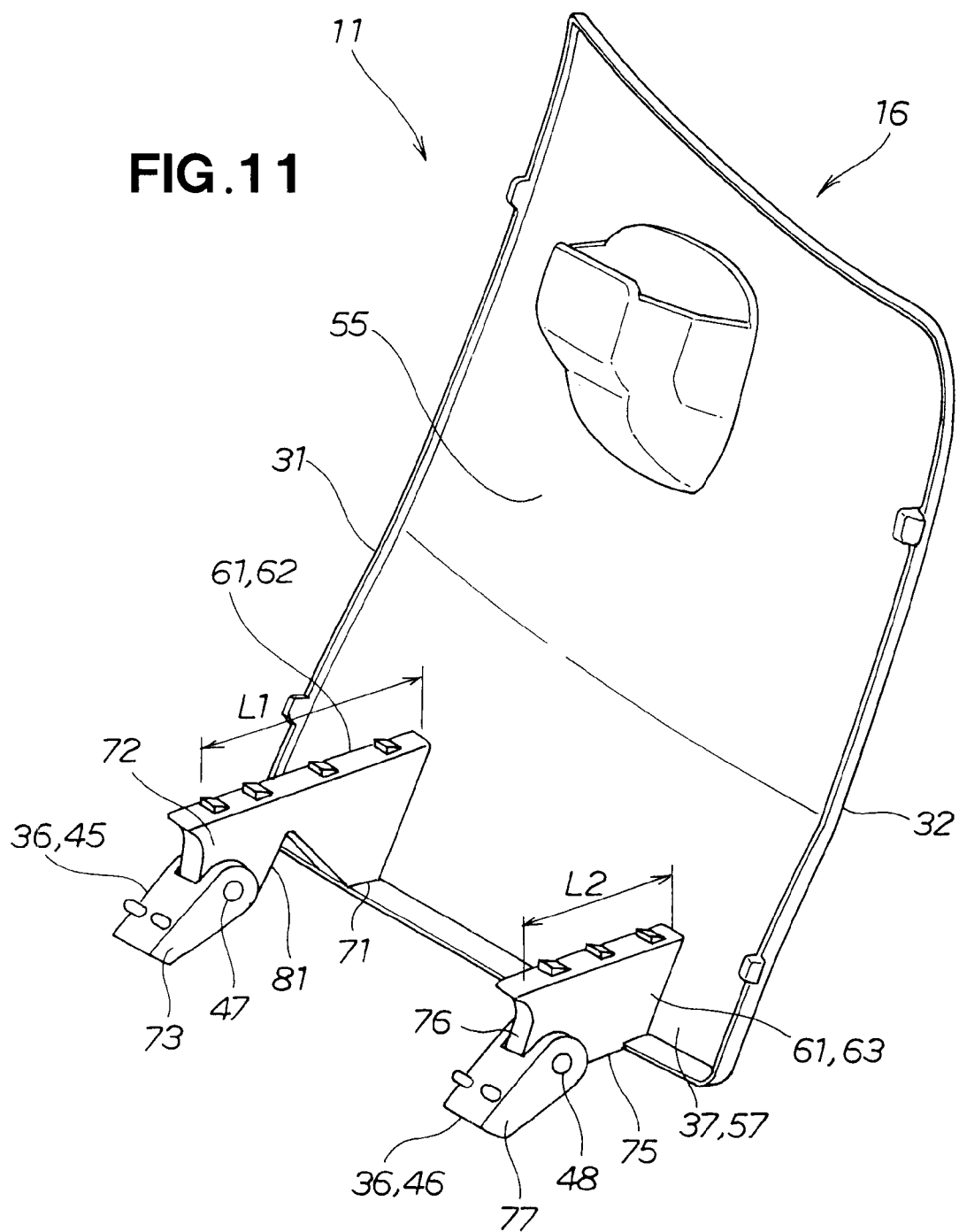
FIG. 11 is a view as seen in the direction of arrow 11 of FIG. 7, showing in perspective the convex part and a hinge mechanism mounted on the lid.

The first hinge mechanism 45 has a first piece member 73 swingably mounted on the first shaft part 47 provided to a first convex distal end 72 of a first convex lower part 71 of the first convex part 62, as seen in FIGS. 9, 10, and 11.

The second hinge mechanism 46 has a second piece member 77 swingably mounted on the second shaft part 48 provided to a second convex distal end 76 of a second convex lower part 75 of the second convex part 63.

The first convex part 62 extends in a square columnar form toward the interior of the instrument panel 14 (FIG. 2) from the rear surface of the interior wall part 55, has a projecting length of L1, and has a deformation allowance part 81 notched downward in substantially the center portion of the first convex lower part 71.

The deformation allowance part 81 is a notched location in a chevron shape, wherein θ is the angle of the chevron shape, and the distance H2 from the first convex lower part 71 to the point of origin 82 of deformation is greater than the distance H1 from the first convex lower part 71 to the first shaft part 47.

The second convex part 63 extends in a square columnar form toward the interior of the instrument panel 14 from the rear surface of the interior wall part 55, wherein L2 is a projecting length, and the length L2 is in a relationship L2<L1; and is shorter than the first convex part 62.

In other words, the first convex part 62 is longer in comparison with the second convex part 63 by an amount equal to the difference in the distance from the seat 26 of the passenger seat 13, or the distance from the vehicle occupant M, in accordance with the curve of the instrument panel 14. The difference in distance is, e.g., Y2−Y1 or Yb2−Yb1 of FIG. 1.

Figure 12A:
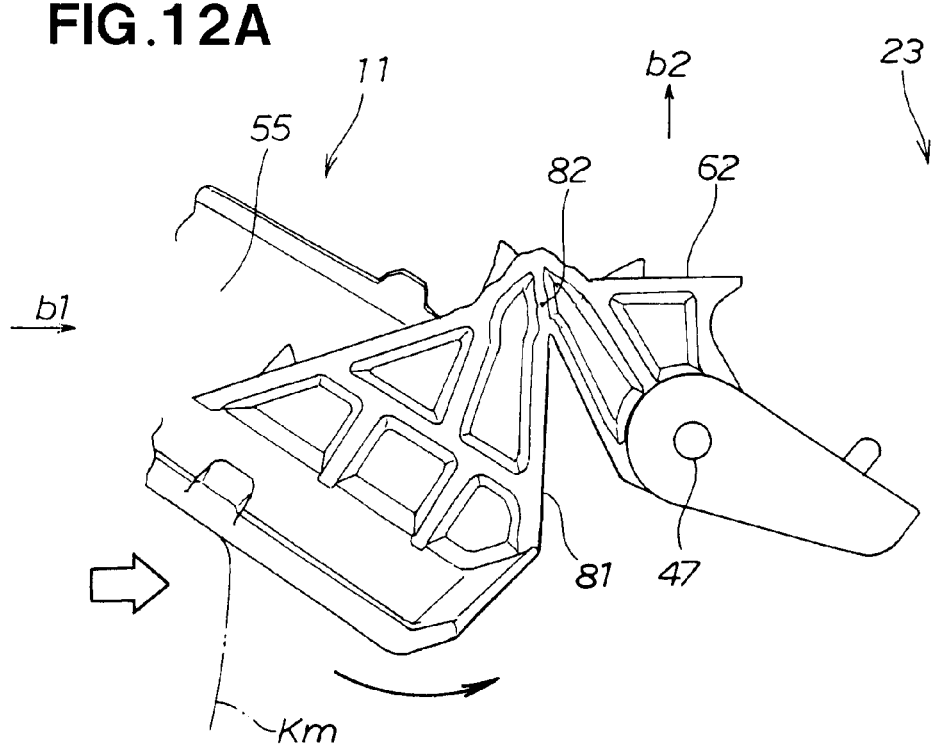
FIG. 12A shows a state in which the deformation allowance part formed on the convex part has deformed, while FIG.
Figure 12B:
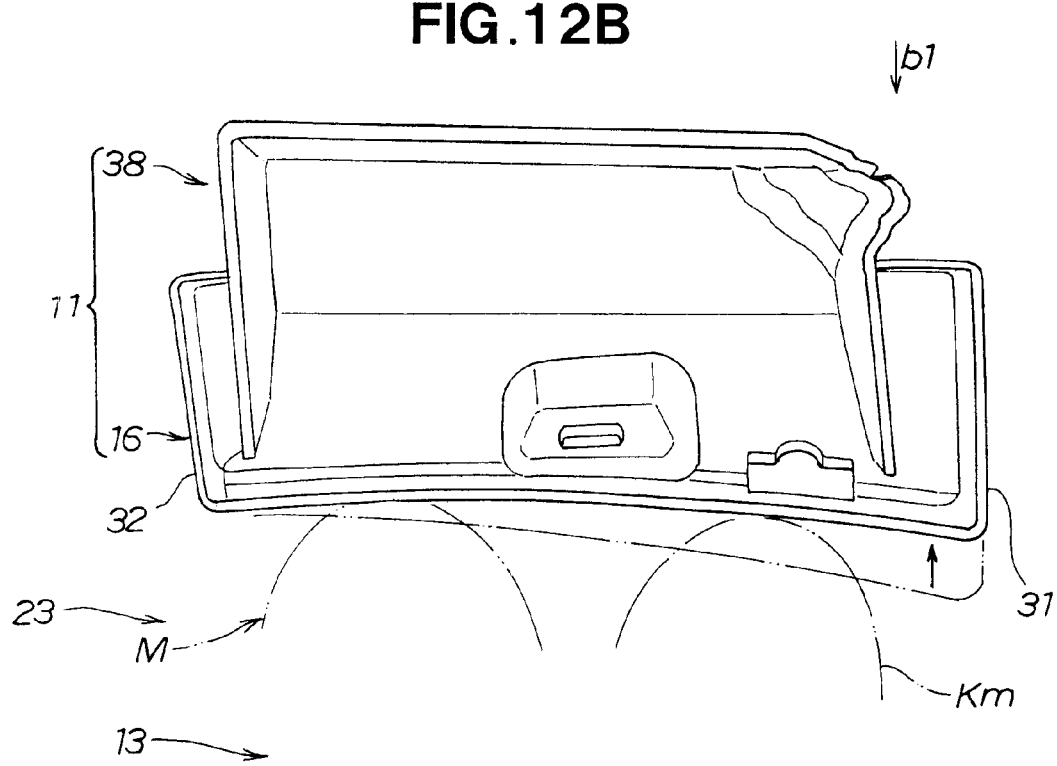

Impact absorption of the storage device when the vehicle has a frontal collision will be described next, while viewing FIGS. 1 and 2, and with reference to FIGS. 12A and 12B.

When the vehicle 12 has a frontal collision, there are occasions in which the instrument panel 14 is pushed into the passenger compartment 23 as shown by arrow b1 in accompaniment with damage to the front body 17, and the storage device 11 together with the instrument panel 14 may reach the vehicle occupant M seated on the seat 26 of the passenger seat 13. Since a load is applied to the first convex part 62 when there is interference between the right leg (one leg) Km of the vehicle occupant M and the lid 16 of the pushed storage device 11, the force (stress) applied to the point of origin 82 of the deformation allowance part 81 increases (concentration of stress), and the deformation allowance part 81 begins to deform, and then continues to deform and buckles upward above the first shaft part 47 (in the direction of arrow b2) while absorbing the impact. The first convex part 62 becomes short and the box part 38 also collapses in accordance with the deformation of the first convex part 62 depending on impact conditions. As a result, the impact applied from the front surface of a vehicle 12 can be absorbed even when storage depth cannot be provided.

The storage device 11 of a vehicle of the present embodiment is particularly effective in a glove box disposed in the vicinity of the position of the legs of a vehicle occupant M, or in a glove box disposed on the lower surface side of the instrument panel 14.

After the right leg (one leg) Km of the vehicle occupant M and the lid 16 have interfered, the impact of the interference is absorbed, and the first convex part 62 becomes short, whereupon the difference in the distance between one end 31 of the lid 16 and the other end 32 is reduced and the lid 16 becomes substantially parallel with the seat 26. Therefore, the lid 16 having become parallel continues to press upon the two legs substantially uniformly in the case of an even larger impact, and the impact applied to the legs can be dispersed to the left and right, even with a curved lid 16. In other words, an impact can be absorbed effectively even in a case when there is variability in input force.

An example was shown in which the storage device of the present embodiment was applied to a glove box, but application can also be made to object other than a glove box.

The first convex part 62 had a square columnar form in cross section, but is not limited to a square columnar form.

The deformation allowance part 81 had a chevron shape but is not limited to the chevron shape. For example, formation in the shape of the letter "U" or the shape of a saw tooth is also possible.

The second convex part 63 may also be provided with a deformation allowance part 81.

The storage device of the present embodiment is suitable for a glove box provided to the front of a passenger seat.

Obviously, various minor changes and modifications of the present invention are possible in light of the above teaching. It is therefore to be understood that within the scope of the appended claims the invention may be practiced otherwise than as specifically described.

What is claimed is:

1. A vehicular storage device, comprising:
   a lid disposed in opposed relation to a vehicle occupant;
   a convex part protruding from a rear surface of the lid in a direction opposite from the vehicle occupant; and
   a shaft part provided on the convex part for swingably supporting the lid as the lid moves between an open position and a closed position,
   wherein the convex part has a deformation allowance part for allowing deformation when a load of a predetermined level or greater is applied to the convex part.

2. The storage device of claim 1, wherein the shaft part is provided at a distal end of the convex part, and the deformation allowance part has a chevron shape notched to open downwardly at a center portion of the convex part.

3. The storage device of claim 1, wherein the lid is arranged such that distances from left and right ends of the lid to the vehicle occupant are different, and the deformation allowance part is formed on the convex part which is provided on that one of right and left ends of the lid which has a shorter distance to the vehicle occupant.

4. A storage device for a vehicle comprising:
   a swingably supported lid;
   a first convex part having a first length and protruding from a rear surface of the lid toward a front of the vehicle, the first convex part having a deformation allowance part for allowing deformation to the first convex part when a load of a predetermined level or greater is applied to the first convex part; and
   a second convex part having a second length and protruding from the rear surface of the lid toward the front of the vehicle,
   wherein the first length of the first convex part is greater than the second length of the second convex part.

5. The storage device of claim 4 further comprising:
   a first shaft part provided at a distal end of the first convex part for swingably supporting the lid; and
   a second shaft part provided at a distal end of the second convex part for swingably supporting the lid,
   wherein the deformation allowance part has a chevron shape notched to open downwardly at a center portion of the first convex part.

* * * * *